United States Patent [19]

Andre et al.

[11] Patent Number: 4,682,013
[45] Date of Patent: Jul. 21, 1987

[54] APPARATUS FOR CONTROLLING THE COOKING PROCESS IN A PRESSURE COOKER

[75] Inventors: Wolfram K. Andre; Kurt Wolf, both of Wildbad, Fed. Rep. of Germany

[73] Assignee: Kurt Wolf & Co. KG, Fed. Rep. of Germany

[21] Appl. No.: 811,004

[22] Filed: Dec. 19, 1985

[30] Foreign Application Priority Data

Dec. 24, 1984 [DE] Fed. Rep. of Germany ....... 3447296

[51] Int. Cl.$^4$ .............................................. H05B 1/02
[52] U.S. Cl. .................................... 219/497; 219/492; 219/506; 99/330; 426/523
[58] Field of Search ............... 219/486, 501, 497, 492, 219/493, 506, 10.55 B; 99/328, 332, 333, 335, 330; 426/520, 523

[56] References Cited

U.S. PATENT DOCUMENTS 4,379,964 4/1983 Kanazawa et al. .................. 219/492
4,585,925 4/1986 Andre ................................. 219/492

FOREIGN PATENT DOCUMENTS 3323399 4/1985 Fed. Rep. of Germany .

Primary Examiner—M. H. Paschall
Attorney, Agent, or Firm—Thomas W. Speckman; Ann W. Speckman

[57] ABSTRACT

An apparatus is provided to control the cooking process in a pressure cooker heated by an electrical heating element. By measuring values related to the temperature-time characteristic curve during the heating up phase, the cooking system is operated in an energy saving manner utilizing the inertia of the system by switching off the heating element prematurely to maintain the desired cooking time. By providing an additional mode of operation, the cooking process can be carried out in several successive cooking phases while still providing the energy saving feature of prematurely switching off the heating element in all cooking phases.

20 Claims, 3 Drawing Figures

APPARATUS FOR CONTROLLING THE COOKING PROCESS IN A PRESSURE COOKER

BACKGROUND OF THE INVENTION

1. Field of the Invention

The present invention relates to an apparatus for controlling the cooking process in a pressure cooker containing water and/or food to be cooked and heated by means of an electrical heating unit with a control circuit, wherein the temperature in or on the pressure cooker is detected and utilized by a regulating circuit of the control circuit for regulation of the heat output of the heating element. A cooking time may be preset by means of an adjustable timer and measurement of the preset cooking time begins only when a predetermined temperature between the preset cooking temperature and the evaporation temperature of the water in the pressure cooker has been reached. The time period between reaching the temperature at the beginning of the vapor phase and reaching the evaporation temperature of water in the pressure cooker is measured and the preset cooking time is adjusted on the basis of the slope of the temperature-time characteristic curve and/or the measured time period by shutting off the heating element before the preset cooking time has elapsed, with the shutting off occurring sooner the smaller the detected slope and/or the greater the measured time period.

2. Description of the Prior Art

An apparatus of this general type is disclosed in German Patent No. 33 23 399 of the applicant. Detection of the slope of the temperature-time characteristic curve and determination of the time period elapsing between reaching the temperature at the beginning of the vapor phase and reaching the temperature of evaporation of the water in the pressure cooker provide for energy saving cooking, since thereby the inertia of the whole system can be optimally utilized, depending upon the contents in the pressure cooker, by switching off the heating element before the preset time has elapsed. It is assured in every case, however, that the proper cooking temperature is maintained in the pressure cooker for the preselected cooking time.

The disadvantage of this device is that the energy saving is possible only if the cooking process continues without interruption. Often, however, it is desirable to interrupt the cooking process, for example, to add more material to be cooked. Let us mention just the addition, after an initial cooking phase, of cooking material that is to be subjected to only a brief cooking time.

SUMMARY OF THE INVENTION

An objective of the present invention is to provide an apparatus of the type described above, in which a cooking process can take place in several cooking phases without the attendant interruptions affecting energy saving cooking by switching off the heating element before the preset cooking time has elapsed, yet maintaining the preset cooking time in the pressure cooker.

The present invention achieves this objective in the following manner: using additional switching means, the cooking process is divided into several successive cooking phases; the cooking process may be interrupted for the duration of a switching operation; after the first cooking phase of a cooking process the detected slope of the temperature-time characteristic curve and the time period measured during the heating-up phase to the final switch-off of the system is stored; these stored values are used in subsequent cooking phases for the advanced switching off of the heating element to maintain the preset cooking time in the pressure cooker.

With the additional switching capability a new type of operation is provided in which the cooking process may be interrupted, and the values from the heating phase until the final switching off of the system are stored after the first cooking phase so that they are available at any time for the advanced switching off of the heating element in subsequent cooking phases. Often the interruption between two cooking phases is so brief that there is no measurable drop in the temperature in the pressure cooker. The previous history of the heating-up phase, however, is preserved and can be utilized whenever desired for energy saving cooking in subsequent cooking phases.

For cooking with steam in a pressure cooker, an embodiment is preferred wherein a temperature for fast cooking and a temperature for vitamin preserving cooking can be preset by means of a temperature selector device. In this embodiment, provision is simply made for the temperature selector to have two selector buttons, with one selector button always controlling the control circuit, and the control circuit depending upon a signal presetting the appropriate cooking temperature from one or the other control button for which varied designs and couplings of selector buttons are available.

Another advantageous embodiment provides that by means of an operation mode switch two modes of operation can be preset, that according to the first operation mode the control circuit emits a signal after completion of the preset cooking time, and that according to the second operation mode the control circuit initiates the advanced switching off of the heating element to maintain the preset cooking time in the pressure cooker and transmits an indicator signal only upon falling below the evaporation temperature of the water.

In the first mode of operation, the pressurized cooker can be removed from the heating element immediately upon completion of the cooking time, if the switching operation has been previously indicated. When the pressure cooker is removed from the heating element, in the case of the known device, the system is switched off in a known manner and a warning signal is given. The sequence is altered according to the present invention by the introduction of a new mode of operation wherein the heating element remains switched off for the duration of the additional switching operations and the emission of a warning signal is blocked through the control circuit. The pressurized cooker can be cooled off in a known way and then opened up for the addition of additional material to be cooked.

An especially advantageous embodiment is one wherein an acoustic signal is given off by the control circuit.

The inclusion of the new mode of operation providing different modes of operation for the cooking process is achieved in a very simple manner by feeding the switching steps to the control circuit by an additional switch point on the operation mode switch. A rotary switch with three switch points may be used as an operation mode switch. Three pushbuttons may also be used, of which, by means of appropriate design and coupling, only one at any given time is in the ON position.

To initiate a subsequent cooking phase, one embodiment provides that after each additional switching step, a new cooking time may be entered into the control circuit and one of the operation modes is again indicated to the control circuit by the operation mode switch, or that the subsequent cooking phase can be carried out for the same cooking time or by means of the activation of the appropriate selector button indicating reduced cooking temperature.

Since an increase in the inertia of the system is associated with the addition of further cooking material, another embodiment designed to enhance energy saving provides that in accordance with the additional switching steps the control circuit can be provided a supplementary signal that leads to an increase in the time interval for the advanced switching off of the heating element determined from the stored values measured during the heating up phase.

BRIEF DESCRIPTION OF THE DRAWING

The invention will be explained in further detail with reference to the drawings of one embodiment of the apparatus with various operation modes in which.

DESCRIPTION OF PREFERRED EMBODIMENTS

Figure 1:
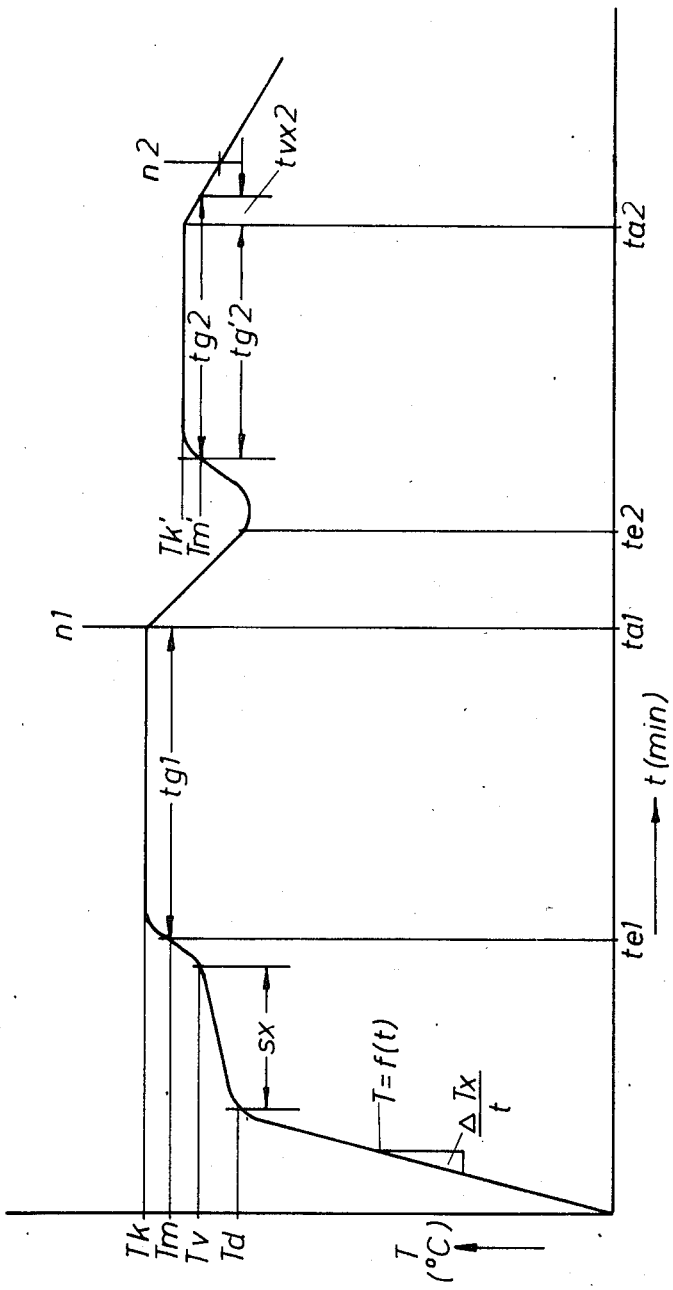
FIG. 1 shows the temperature-time characteristic curve for a cooking process divided into two cooking phases, wherein the first cooking phase takes place according to a first operation mode, and the second cooking phase according to a second operation mode.

The temperature-time characteristic curve $T = f(t)$ in FIG. 1 shows a cooking process that takes place in two cooking phases. This temperature-time characteristic curve $T = f(t)$ is dependent upon the kind and the quantity of cooking material in the heated pressure cooker. Slope $\Delta Tx/t$ of the temperature-time characteristic curve during the heating up phase and time interval sx, which extends from reaching temperature Td at the beginning of the vapor phase at about 90° C., to reaching evaporation temperature Tv of water in the pressure cooker at about 100° C., indicate the type and quantity of cooking material, and thereby the inertia, i.e., the time constant of the entire system. After the heating element has been switched off, the temperature in the pressure cooker, due to the inertia of the system, decreases at a faster or slower rate, so that a temperature adequate for cooking is maintained for more or less time in the pressure cooker. Using the values of $\Delta Tx/t$ and sx determined during the heating up phase, a conclusion can be drawn as to the anticipated characteristics of the cooling off phase and the heating element H can be switched off before the preset time has elapsed to maintain the corresponding cooking temperature Tk in the pressure cooker only for the preset cooking time. Switching off of heating element H occurs sooner the longer the anticipated cooling off phase is. The cooling off phase is longer as the slope $\Delta Tx/t$ is smaller and the time interval sx is larger.

Figure 3:
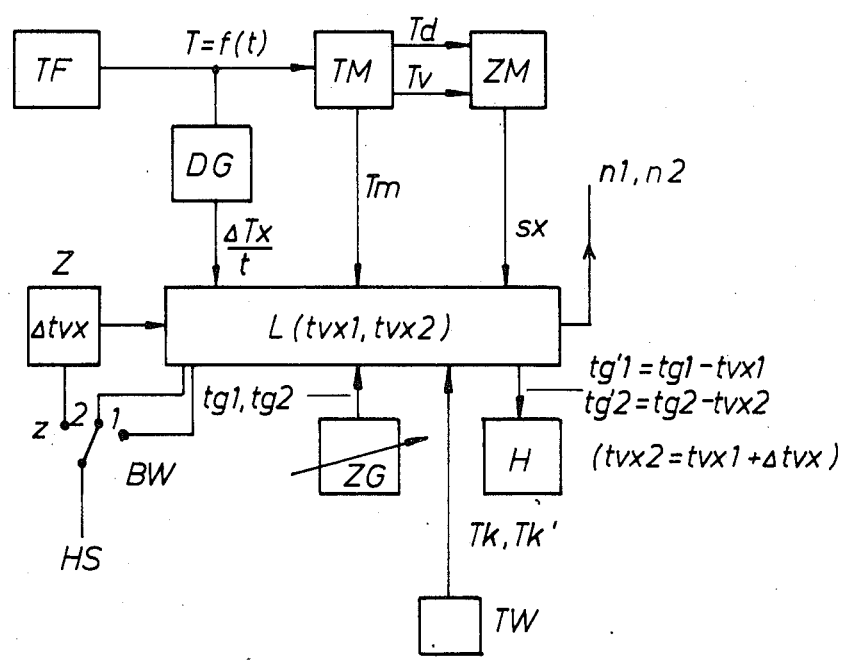
FIG. 3 shows a schematic block diagram of the apparatus.

In the temperature-time characteristic curve $T = f(t)$ shown in FIG. 1, after evaporation temperature Tv of the water in the pressure cooker is exceeded and at temperature Tm, measurement of the preset cooking time tg1 is begun, as time point te1 on the time coordinate shows. The cooking temperature Tk is adjusted to a temperature that is higher than temperature Tm. Temperature Tm is preferably only a few degrees C. below cooking temperature Tk, which for quick cooking or boiling can be set, for example, at 117° C. When preset cooking time tg1 has expired, control circuit L as shown in FIG. 3 gives off a preferably acoustic signal n1. As time point ta1 shows, heating element H can be switched off at the same time. The temperature in the pressure cooker then decreases. If the pressure cooker is removed from heating element H after time point ta1, then extra switching step z is first relayed to control circuit L as shown in FIG. 3.

The temperature is detected in or on the pressure cooker by means of temperature sensor TF. Temperature sensor TF emits an output signal that is proportional to the temperature in the pressure cooker and corresponds, over time, to the course of temperature-time characteristic curve $T = f(t)$. A first evaluator signal $\Delta Tx/t$ characterizing the slope $\Delta Tx/t$ is obtained by means of differentiating circuit DG from the temperature sensor TF output signal. Also, temperature sensor TF output signal control temperature measuring device TM, which upon a signal indicating temperature Td triggers time-measuring device ZM. Timer ZM determines time interval sx that elapses until temperature Tv is reached, which is indicated to timer ZM by temperature measuring device TM. Timer ZM transmits a signal representing time interval sx to control circuit L, to which a first evaluator signal characterizing slope $\Delta Tx/t$ of temperature-time characteristic curve $T = f(t)$ is also fed by differentiating circuit DG. Control circuit L derives from these signals, taking into consideration the constants of the system, a time interval by which preset cooking time tg1 can be shortened for earlier switching off of the heating element, when it is desired to take advantage of the inertia of the system for energy saving cooking.

In the embodiment of FIG. 1, operation mode 1 is being used. Mode switch BW is in switching position 1. Control circuit L is signalled by this that the cooking process is to be a quick one. Temperature Tk is preset to about 117° C. Temperature selector device TW has preferably two selector buttons that are set for temperatures Tk and Tk'. Temperature Tk' is about 104° C. and results in the vitamin preserving cooking of the cooking material.

If mode 1 and temperature Tk are preset, then in the presence of the cooking time Tg1 set by timing circuit ZG, indicator signal n1 is emitted when timer ZM indicates the expiration of cooking time tg1.

If mode selector switch BW is set in switching position 2 then the pressure cooker can be removed from heating element H. Thereupon, via circuit Z, a supplementary signal $\Delta tvx$ is tramsitted to control circuit L which results in the storage of values $\Delta Tx/t$ and sx measured up to the final switching off of the system. Control circuit L stores these values and does so in a way suitable for the premature switching off of the heating element in subsequent cooking phases.

If the pressure cooker is replaced on heating element H, then mode switch BW is set at position 2, which indicates operation mode 2 to control circtui L in which cooking is to continue on an energy saving basis. To this end, a new cooking time tg2 is set by timing circuit ZG, and via temperature selector TW, new cooking temperature Tk' is set. The second cooking phase takes place in a vitamin preserving cooking mode. Control circuit L processes the stored values for ΔTx/t and sx, as well as the supplementary signal Δtvx from supplementary circuit Z and derives a time interval tvx2, which results in switching off of heating element H before the preset cooking time has elapsed. Switching off time point ta2 for the heating element is determined by time interval tvx2 before the end of preset cooking time tg2, as indicated by time interval tg'2, which runs from the beginning of the measuring of preset cooking time tg2 until the switching off of heating element H. Indicator signal n2 is emitted by control circuit L in mode 2 only when the temperature drops below Tv. The pressure in the pressure cooker is then so decreased that the pressure cooker can be safely opened.

Figure 2:
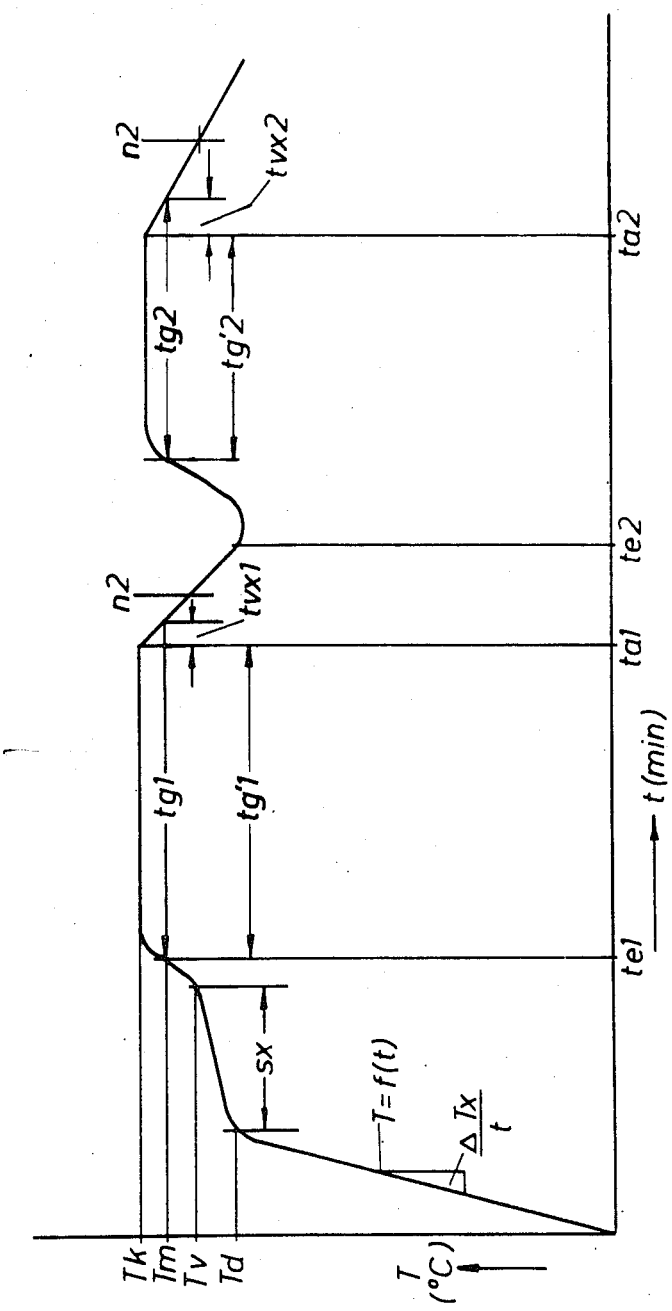
FIG. 2 shows the temperature-time characteristic curve for a cooking process divided into two cooking phases wherein both cooking phases take place according to the second energy saving operation mode.

In the embodiment of FIG. 2, the values ΔTx/t and sx are used for switching off heating element H prior to the end of the preset cooking time. In the first cooking phase, preset cooking time tg1 extends beyond the switching off of heating element H, which occurs at time point Ta1, which is advanced before the preset cooking time elapses by time interval tvx1. Time interval tg'1 is determined by the difference tg1-tvx1. Time interval tvx1 is derived by control circuit L from the values of ΔTx/t and sx during the heating up phase.

Supplementary switching step z results in storage of the values relevant to determine time interval tvx1 during the heating up phase, extending to the final switching off of the system. At the same time, switching off of heating element H is maintained for the duration of supplementary switching step z and the emission of a warning indication by control circuit L is prevented when the pressure cooker is removed from the heating element.

After replacement of the pressure cooker on heating element H, operation mode switch BW is again set at switch position 2, where it was set during the first cooking phase. Temperature selecting device TW requires no new setting, since cooking temperature Tk is adjusted in the second cooking phase. Cooking time tg2 is supplied by timer ZG. Time interval tvx2 determining the premature switching off of heating element H is determined in this pahse by the control circuit from the values ΔTx/t, sx and Δtvx, since with the addition of cooking material the inertia of the system is increased. An additional signal Δtvx is at the same time established as an average value, since further information can be derived from the temperature-time characteristic curve T=f(t) in this area concerning the type and quantity of the added cooking material.

If control circuit L shuts off heating element H at time point ta2, whereupon the time interval tg'2 results from the difference tg2-tvx2 and tvx2 is calculated from tvx1+Δtvx, then the temperature in the pressure cooker again drops below evaporation temperature Tv and the control circuit signals the end of the cooking process by indicator signal n2. In the case of this operation mode 2, the pressure cooker can be opened immediately, since the pressure has already decreased to a safe point.

We claim:

1. Apparatus for controlling a cooking process comprising at least two cooking phases separated by an interruption in a cooking system with a pressure cooker heated by a heating element and controlled by a control circuit, said apparatus comprising: a temperature sensor means (TF) detecting and emitting signals indicating the temperature at said pressure cooker; an adjustable timing means (ZG) for presetting a desired preset cooking time (tg1, tg2); a temperature selector means (TW) adjustable to at least a first preset cooking temperature (Tk) and a second preset cooking temperature (Tk') lower than said first preset cooking temperature (Tk); differentiating means (DG) receiving said temperature signals from said temperature sensor means (TF) and determining a slope (ΔTx/t) of a temperature-time curve characteristic of said cooking system during a heating up period in each said cooking phase; a temperature measurement means (TM) in communication with a time measurement means (ZM), said temperature measurement means detecting when a measurement temperature (Tm) is reached and signalling said time measurement means (ZM) when a temperature Td corresponding to a vapor phase temperature and a temperature Tv corresponding to an evaporation temperature is reached in each said cooking phase, and said time measuring means (ZM) measuring a time interval (sx) therebetween; a control circuit means (L) receiving signals corresponding to said slope (ΔTx/t), said measurement temperature (Tm), said time interval (sx), said preset cooking time (tg1, tg2), and said preset cooking temperature (Tk, Tk'), said control circuit means (L) commencing measurement of said preset cooking time (tg1, tg2) when said measurement temperature (Tm) signal is received, said control circuit means (L) determining an adjustment time interval (tvx1, tvx2) for at least one said cooking phase, said adjustment time interval (tvx1, tvx2) proportional to said time interval (sx) and inversely proportional to said slope (ΔTx/t), and said control circuit means (L) subtracting said adjustment time interval (tvx1, tvx2) from said preset cooking time (tg1, tg2) to determine a shortened cooking time; and a switching means (Z) dividing said cooking process into said successive cooking phases, said switching means (Z) signalling said control circuit (L) to store said measured values for said slope (ΔTx/t), and said time interval (sx) for the preceding said cooking phase, said control circuit means (L) retrieving and utilizing said measured values in subsequent said cooking phases to determine said adjustment time intervals (tvx1, tvx2).

2. Apparatus of claim 1, wherein said first preset cooking temperature (Tk) corresponds to a temperature for quick cooking and boiling and said second preset cooking temperature (Tk') corresponds to a temperature for vitamin preserving cooking.

3. Apparatus of claim 2, wherein said temperature selector means (TW) has two selector buttons; only one said selector button controls said control circuit (L) during any one said cooking phase; and said control circuit (L) adjusts said preset cooking temperature (Tk, Tk') corresponding to said selector button for each said cooking phase.

4. Apparatus of claim 3, additionally comprising a mode of operation switch means (BW) in communication with said control circuit (L) for presetting a first and a second operation mode (1, 2), respectively, wherein according to said first operation mode (1) said control circuit (L) emits an indicator signal (n1) after expiration of said preset cooking time (tg1), and according to said second operation mode (2) said control circuit (L) switches off said heating element (H) after said shortened cooking time has elapsed and said control circuit emits an indicator signal (n2) when said temperature at said pressure cooker drops below said evaporation temperature (Tv) of said water.

5. Apparatus of claim 4, wherein said control circuit (L) emits acoustic indicator signals (n1, n2).

6. Apparatus of claim 4, wherein said mode of operation switch means (BW) is provided with an additional switching position (z) which indicates said interruptions separating said cooking phases to said control circuit (L).

7. Apparatus of claim 6, wherein said mode of operation switch means (BW) comprises a rotary switch having three switching positions.

8. Apparatus of claim 6, wherein said mode of operation switch means (BW) comprises three pushbuttons, only one of which is in an activated position at any time.

9. Apparatus of claim 8, wherein when said mode of operation switch means (BW) is in said additional switching position (z), said heating element (H) remains switched off and said control circuit means (L) is prevented from emitting an indicator signal (n1, n2).

10. Apparatus of claim 9, wherein said mode of operation switch means (BW) signals a new preset cooking time to said control circuit (L) after each said additional switching position (z).

11. Apparatus of claim 10, wherein activation of one of said selector buttons on said mode of operation switch means (BW) indicates said preset cooking temperature for a subsequent said cooking phase.

12. Apparatus of claim 11, wherein said switch means (Z) transmits a supplementary signal ($\Delta tvx$) to said control circuit means and said control circuit means combines said supplementary signal with said adjustment time interval (tvx1, tvx2) to determine when to shut off said heating element (H) when said interruption is indicated.

13. Apparatus of claim 1, additionally comprising a mode of operation switch means (BW) in communication with said control circuit (L) for presetting a first and a second operation mode (1, 2), respectively, wherein according to said first operation mode (1) said control circuit (L) emits an indicator signal (n1) after expiration of said preset cooking time (tg1), and according to said second operation mode (2) said control circuit (L) switches off said heating element (H) after said shortened cooking time has elapsed and said control circuit emits an indicator signal (n2) when said temperature at said pressure cooker drops below said evaporation temperature (Tv) of said water.

14. Apparatus of claim 6, wherein when said mode of operation switch means (BW) is in said additional switching position (z), said heating element (H) remains switched off and said control circuit means (L) is prevented from emitting an indicator signal (n1, n2).

15. Apparatus of claim 6, wherein said mode of operation switch means (BW) signals a new preset cooking time to said control circuit (L) after each said additional switching position (z).

16. Apparatus of claim 1, wherein said switch means (Z) transmits a supplementary signal ($\Delta tvx$) to said control circuit means and said control circuit means combines said supplementary signal with said adjustment time interval (tvx1, tvx2) to determine when to shut off said heating element (H) when said interruption is indicated.

17. Apparatus of claim 2, additionally comprising a mode of operation switch means (BW) in communication with said control circuit (L) for presetting a first and a second operation mode (1, 2), respectively, wherein according to said first operation mode (1) said control circuit (L) emits an indicator signal (n1) after expiration of said preset cooking time (tg1), and according to said second operation mode (2) said control circuit (L) switches off said heating element (H) after said shortened cooking time has elapsed and said control circuit emits an indicator signal (n2) when said temperature at said pressure cooker drops below said evaporation temperature (Tv) of said water.

18. Apparatus of claim 7, wherein when said mode of operation switch means (BW) is in said additional switching position (z), said heating element (H) remains switched off and said control circuit means (L) is prevented from emitting an indicator signal (n1, n2).

19. Apparatus of claim 4, wherein said switch means (Z) transmits a supplementary signal ($\Delta tvx$) to said control circuit means and said control circuit means combines said supplementary signal with said adjustment time interval (tvx1, tvx2) to determine when to shut off said heating element (H) when said interruption is indicated.

20. Process for adjusting a preset cooking time for a cooking process comprising at least two cooking phases for cooking food materials in a pressure cooker heated by a heating element and controlled by a control circuit in which the temperature of said steam pressure cooker and its food materials is detected at times during the cooking process and utilized by said control circuit to regulate the heat output of said heating means and in which preset cooking times (tg1, tg2) are set by an adjustable timing means and adjusted by said control circuit, comprising:

heating said cooker and its food materials during a first cooking phase, interrupting said cooking process, and heating said cooker and its food materials during a second cooking phase;

measuring the temperature of said cooker during a heating period in each said cooking phase and determining a slope ($\Delta Tx/t$) of a temperature-time curve (T=f(t)) during each said heating period, said slope of said temperature-time curve characteristic of said cooking process and said food materials;

measuring a time interval (sx) elapsing between said cooker reaching a vapor phase temperature (Td) and an evaporation temperature of water (Tv) during each said heating period, said time interval (sx) characteristic of said cooking process and said food materials;

storing values for said slope ($\Delta Tx/t$) and said time interval (sx) measured during said first cooking phase upon said interruption of said cooking process;

determining an adjustment time interval (tvx1, tvx2) for said cooking process during at least one said cooking phase based upon said slope ($\Delta Tx/t$) and said time interval (sx) measured during said cooking phases, said adjustment time interval (tvx1, tvx2) increasing as said slope ($\Delta Tx/t$) decreases and said time interval (sx) increases;

shortening at least one said preset cooking time (tg1, tg2) by said adjustment time interval (tvx1, tvx2) and deactivating said heating element after said shortened cooking time has elapsed.

* * * * *